(12) United States Patent
Ishikawa

(10) Patent No.: US 8,989,076 B2
(45) Date of Patent: Mar. 24, 2015

(54) MOBILE COMMUNICATION SYSTEM AND MOBILE COMMUNICATION METHOD

(75) Inventor: Yasuaki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 812 days.

(21) Appl. No.: 13/256,663

(22) PCT Filed: Feb. 23, 2010

(86) PCT No.: PCT/JP2010/052678
§ 371 (c)(1),
(2), (4) Date: Sep. 15, 2011

(87) PCT Pub. No.: WO2010/106879
PCT Pub. Date: Sep. 23, 2010

(65) Prior Publication Data
US 2012/0003971 A1    Jan. 5, 2012

(30) Foreign Application Priority Data
Mar. 16, 2009 (JP) ................................. 2009-063269

(51) Int. Cl.
*H04J 1/10*    (2006.01)
*H04B 7/26*    (2006.01)
*H04W 48/08*    (2009.01)
*H04W 84/04*    (2009.01)

(52) U.S. Cl.
CPC ............. *H04B 7/2606* (2013.01); *H04W 48/08* (2013.01); *H04W 84/047* (2013.01)
USPC .......................................................... 370/315

(58) Field of Classification Search
CPC ..................................................... H04B 7/2606
USPC .......................................... 370/315; 455/422.1
See application file for complete search history.

(56) References Cited

U.S. PATENT DOCUMENTS 3,628,147 A * 12/1971 Makino .......................... 370/315
4,509,199 A *  4/1985 Ichihara ............................ 455/7
(Continued)

FOREIGN PATENT DOCUMENTS

CN            1905410 A       1/2007
JP         11-220764 A       8/1999
(Continued)

OTHER PUBLICATIONS

International Search Report for PCT/JP2010/052678 mailed Apr. 13, 2010.

(Continued)

*Primary Examiner* — Asad Nawaz
*Assistant Examiner* — Syed S Ali
(74) *Attorney, Agent, or Firm* — Sughrue Mion, PLLC

(57) ABSTRACT

A mobile communication system includes a mobile station connected with a base station by radio when being in a cell formed by the base station, and configured to communicate with a counter side unit through the base station; and a relay station configured to form a limitation area. The relay station receives a downlink signal from the base station and transmits a limitation downlink signal obtained by adding information showing that it is in the limitation area to the downlink signal to the limitation area. When receiving the limitation downlink signal, the mobile station transmits an uplink signal showing a function limited state to the base station in synchronization with a downlink channel received from the base station.

6 Claims, 12 Drawing Sheets

(56) References Cited

U.S. PATENT DOCUMENTS

| | | | | |
|---|---|---|---|---|
| 2003/0117980 | A1* | 6/2003 | Kim et al. | 370/332 |
| 2007/0155315 | A1* | 7/2007 | Lee et al. | 455/11.1 |
| 2007/0197161 | A1* | 8/2007 | Walke et al. | 455/7 |
| 2010/0203892 | A1* | 8/2010 | Nagaraja et al. | 455/437 |

FOREIGN PATENT DOCUMENTS

| | | | |
|---|---|---|---|
| JP | 2000278755 A | 10/2000 | |
| JP | 2000324549 A | 11/2000 | |
| JP | 2002191072 A | 7/2002 | |
| JP | 2006140829 A | 6/2006 | |
| JP | 2008017105 A | 1/2008 | |
| WO | 2007/078872 A1 | 7/2007 | |

OTHER PUBLICATIONS

Chinese Office Action for CN Application No. 201080012448.5 mailed on Sep. 4, 2013 with English Translation.

* cited by examiner

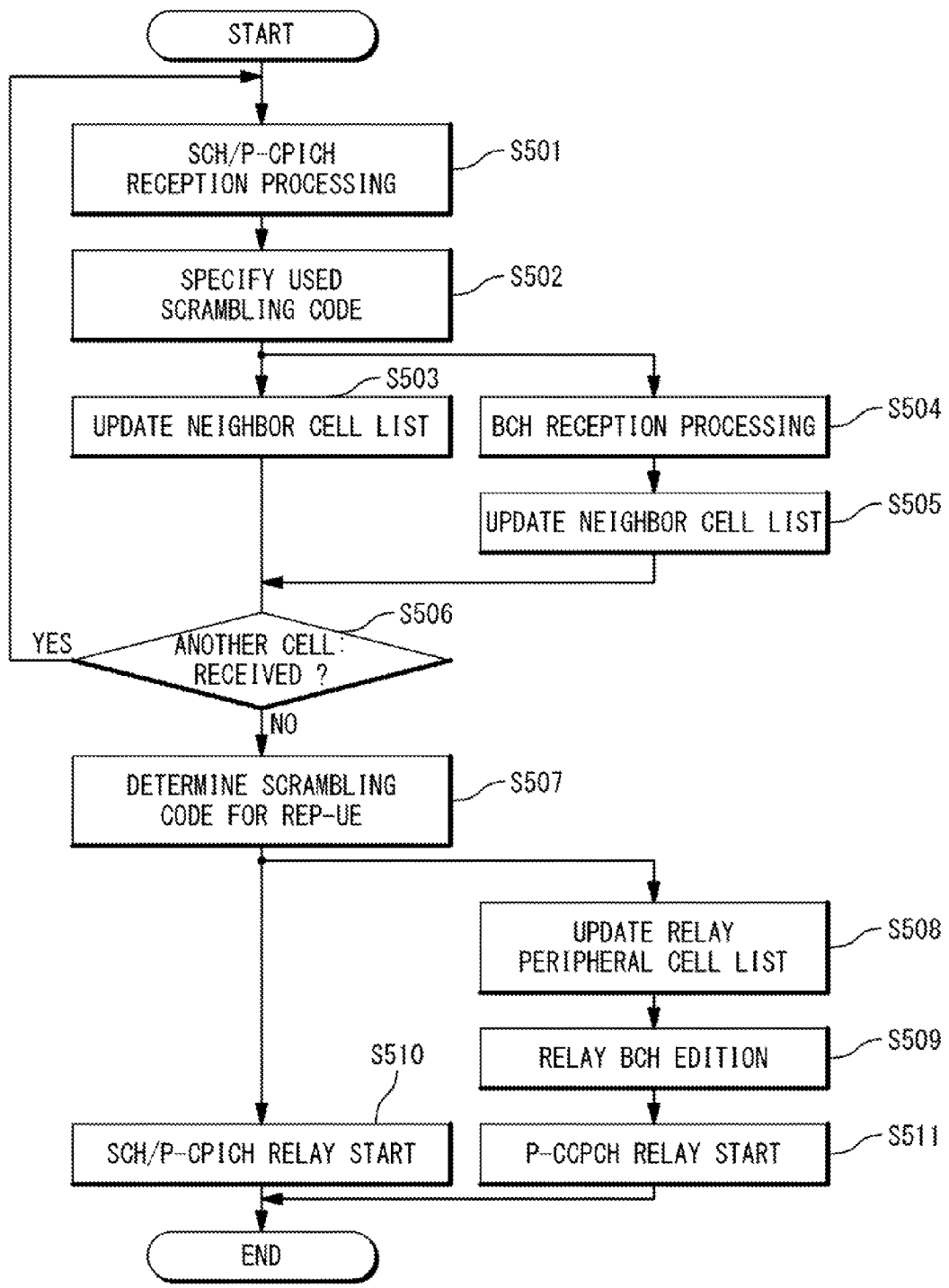

Fig. 11A

| CELL LIST SCRAMBLING CODE | | |
|---|---|---|
| 1 | ... | ... RNC |
| 2 | ... | ... OTHER REP-UE (PERIPHERAL CELL LIST) |
| 3 | ... | ... OTHER REP-UE (NEIGHBOR CELL LIST) |
| 4 | ... | ... RNC |
| 5 | ... | ... NEIGHBOR |
| 6 | ... | ... NEIGHBOR |

PERIPHERAL CELL LIST: rows 1–4

NEIGHBOR CELL LIST: rows 5–6

MOBILE COMMUNICATION SYSTEM AND MOBILE COMMUNICATION METHOD

TECHNICAL FIELD

The present invention is related to a mobile communication system and a mobile communication method.

BACKGROUND ARTS

In a mobile communication system, a mobile station is connected with a radio base station unit (hereinafter, to be referred to as a base station) by radio. The mobile station transmits and receives voice data, picture data, e-mail and so on through the base station to and from a counter side station. To meet a condition that the mobile station is in a communicable state, the mobile station must exist in a range in which electromagnetic wave from the base station reaches. The communication possible area extends as the improvement of the mobile communication system advances, and the mobile station can communicate in an extensive area.

However, because the communication becomes possible in the wide area, inconveniences sometimes occur oppositely. For example, in a hospital, there is a possibility that a malfunction of medical equipment is caused due to an uplink electromagnetic wave outputted from the mobile station. Also, a call is generally prohibited in places, where many persons get together, such as a train and a hotel lobby, and in places where the silence is requested, such as a library, a movie theater and a concert hall, considering inconveniences to other persons. However, it is only prohibited as a moral. If trying to communicate, it is possible to communicate.

On the other hand, a technique is proposed which limits the function of a mobile station in a specific area. For example, In Patent Literature 1 (JP 2000-278755A), a base station forms an electromagnetic wave area in another electromagnetic wave area by another base station and transmits a notice signal which has been spread with a specific spreading code which is different from a spreading code used by the other base station. The function of the mobile station is limited, in case of the reception of the notice signal spread with a specific spreading code from the base station.

Also, Patent Literature 2 (JP 2008-17105A) discloses a mobile communication system of a CDMA (code division multiple access) type in which communication is possible in a cell covered by a radio base station unit. In the mobile communication system, a mobile relay station converts a scrambling code of a downlink signal received from the radio base station unit into a specific code and transmits the downlink signal of the specific code toward a limitation area to limit communication. A mobile station limits the communication of a predetermined service and notifies the limitation of the communication of the predetermined service with an uplink signal, when receiving the downlink signal of the specific code transmitted from the mobile relay station. A control unit limits the communication of predetermined service to the mobile station when receiving the notification of limitation of the communication of the predetermined service with the uplink signal through the radio base station unit from the mobile station.

Besides, the techniques for an inventor of the present invention could know Patent Literature 3 (JP H11-220764A), and Patent Literature 4 (JP 2006-140829A).

CITATION LIST

[Patent Literature 1]: JP 2000-278755A
[Patent Literature 2]: JP 2008-17105A
[Patent Literature 3]: JP H11-220764A
[Patent Literature 4]: JP 2006-140829A

SUMMARY OF THE INVENTION

According to the technique of Patent Literature 2, the mobile relay station is provided with a receiving circuit which receives a downlink signal from a base station and a transmitting circuit to deliver a downlink signal toward only a limitation area. Here, the mobile relay station does not need a special configuration to receive an uplink signal, because it does not participate to the uplink signal. Therefore, the mobile relay station can be configured at a small size, and at a low cost.

However, when transmitting an uplink signal showing that communication is limited, from the mobile station to the base station, the uplink signal must be transmitted at the timing synchronized with the base station. To synchronize the timing of the uplink signal with the base station, it could be considered to transmit the downlink signal of the specific code at the same timing as the downlink signal which is received from the base station in the mobile relay station. In this case, the mobile station can transmit the uplink signal at the timing synchronized with the base station if it detects the timing of the downlink signal of the received specific code. However, in this case, the mobile relay station needs the configuration to synchronize with the base station at a high accuracy.

Therefore, an subject matter of the present invention is to provide a mobile communication system and a mobile communication method, in which it is possible to synchronize the uplink signal showing that a function of the mobile station is limited with the base station at a low cost, in the mobile communication system in which the mobile station receives the downlink signal from the base station through the relay station which forms the function limitation area.

A mobile communication system according to the present invention includes: a mobile station connected with a base station by radio when being in a cell formed by the base station, and configured to communicate with a counter side unit through the base station; and a relay station configured to form a limitation area. The relay station receives a downlink signal from the base station and transmits a limitation downlink signal obtained by adding information showing that it is in the limitation area to the downlink signal to the limitation area. When receiving the limitation downlink signal, the mobile station transmits an uplink signal showing a function limited state to the base station in synchronization with a downlink channel received from the base station.

A mobile communication method of the present invention is achieved by a mobile station communicating with a counter side through the base station connected in a radio, when the mobile station is in a cell formed by the base station; a relay station forming a limitation area; the relay station receiving a downlink signal from the base station and transmitting a limitation downlink signal obtained by adding information showing a limitation area to the downlink signal toward the limitation area; and the mobile station transmitting an uplink signal showing a function limited state to the base station in synchronization with reception of a downlink channel from the base station, when receiving the limitation downlink signal.

An operation method of a mobile station in a mobile communication method according to the present invention, is achieved by communicating with a counter side station through the base station connected by radio, when the mobile station is in a cell formed by a base station; by receiving a imitation downlink signal from a relay station which forms a limitation area; and by transmitting an uplink signal showing limitation of its function to the base station in synchronization with a downlink channel received from the base station, when receiving the limitation downlink signal.

An operation method of a relay station in a mobile communication method according to the present invention, is achieved by forming a limitation area; by receiving a downlink signal spread with a downlink scrambling code from a base station; by adding data showing the limitation area to the downlink signal and generating a imitation downlink signal; and by spreading the limitation downlink signal with a specific scrambling code different from the downlink scrambling code to transmit toward the limitation area. Notice information is contained in the downlink signal and contains data showing the downlink scrambling code used by the base station and data showing a peripheral downlink scrambling code used in a peripheral base station which is provided around the base station. The transmitting toward the limitation area includes: determining the scrambling code to be used as the specifying scrambling code based on the notice information.

According to the present invention, the mobile communication system and a mobile communicating method are provided, in which in the mobile communication system which the mobile station receives the downlink signal from the base station through the relay station which forms a function limitation area, it is possible to synchronize the uplink signal showing a function limitation from the mobile station with the base station in a low cost.

BRIEF DESCRIPTION OF THE DRAWINGS

FIG. 10 is a flow chart showing an operation method of the mobile relay station;

FIG. 11A is a conceptual diagram showing a cell list; and

DESCRIPTION OF EMBODIMENT

Figure 1:
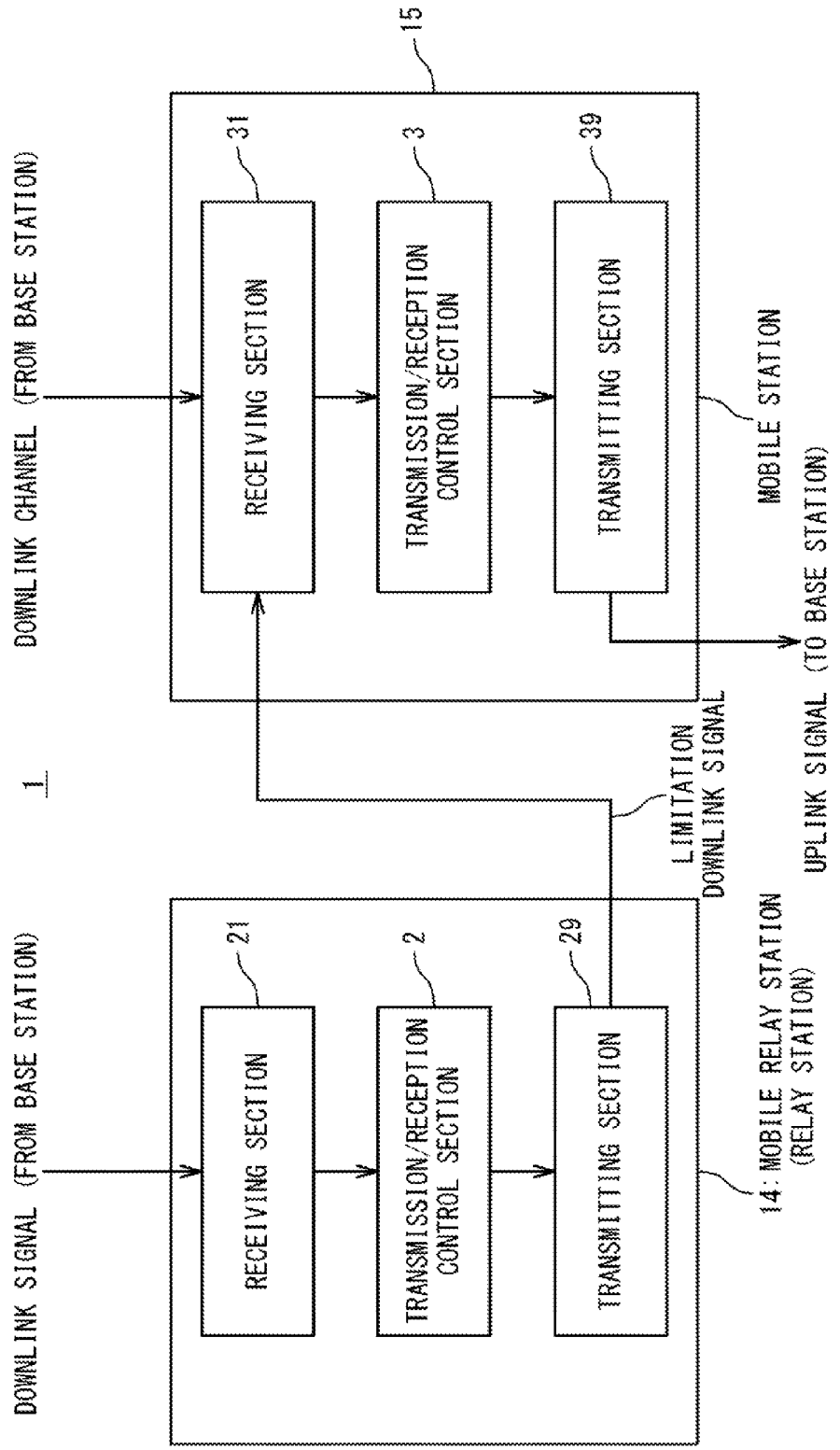
FIG. 1 is a block diagram showing an outline of a configuration of a mobile communication system.

Hereinafter, a mobile communication system of the present invention will be described below with reference to the drawings. FIG. 1 is a block diagram showing a configuration of a mobile communication system 1 according to an exemplary embodiment of the present invention. As shown in FIG. 1, the mobile communication system 1 is provided with a mobile relay station 14 (or a relay equipment) which specifies a limitation area, and a mobile station (or a mobile terminal, or a mobile equipment) 15. The mobile relay station 14 is provided with a receiving section 21, a transmission/reception control section 2 and a transmitting section 29. The mobile station 15 is provided with a receiving section 31, a transmission/reception control section 3 and a transmitting section 39.

Figure 2:
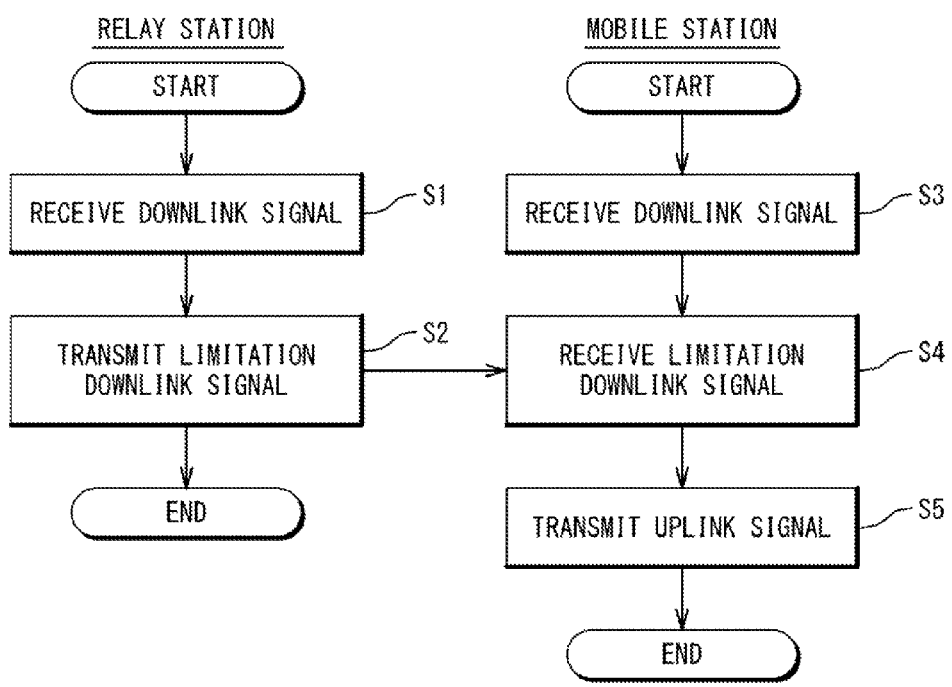
FIG. 2 is a sequence diagram showing an operation of the mobile communication system.

FIG. 2 is a sequence diagram showing an operation of the mobile communication system 1. As shown in FIG. 2, in the mobile communication system 1, the mobile relay station 14 receives a downlink signal from a base station by the receiving section 21 (Step S1). In the mobile relay station 14, the transmission/reception control section 2 generates a limitation downlink signal by adding data indicating a limitation area to the downlink signal, and transmits the limitation downlink signal toward the limitation area from the transmitting section 29 (Step S2). On the other hand, the mobile station 15 receives a downlink channel from the base station by the receiving section 31 (Step S3). Also, the mobile station 15 receives the limitation downlink signal by the receiving section 31 in case of presence in the limitation area (Step S4). In the mobile station 15, when the imitation downlink signal is received, the transmission/reception control section 3 generates an uplink signal indicating that the function of the mobile station 15 is limited. The transmission/reception control section 3 transmits the generated uplink signal to the base station from the transmitting section 39 in synchronization with the reception of the downlink channel from the base station (Step S5).

Figure 3:
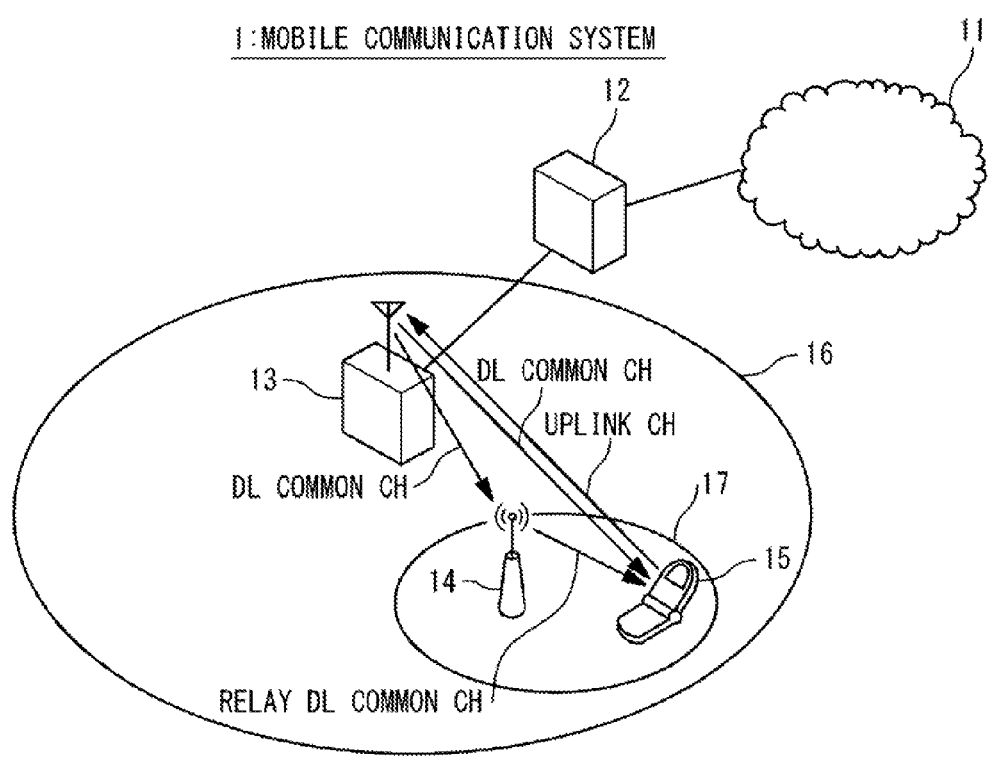
FIG. 3 is a block diagram showing a configuration of the mobile communication system.

Next, the mobile communication system 1 according to the present invention will be described in detail. FIG. 3 is a diagram showing the mobile communication system 1 according to the present exemplary embodiment. In the present exemplary embodiment, the mobile communication system will be described by using a W-CDMA (Wideband Code Division Multiple Access) system as an example. The mobile communication system 1 is provided with a base station control unit 12 (RNC; Radio Network Controller), a plurality of base stations 13 (BTS; Base transceiver Station), the mobile relay station 14 and a plurality of the mobile stations 15. In FIG. 3, in order to simplify the description, one of the plurality of base stations is shown as the base station 13. Similarly, one of the plurality of mobile stations is shown as the mobile station 15. Generally, the system which is provided with the base station control unit 12 and the base station 13 is called UTRAN (UMTS Terrestrial Radio Access Network).

The base station 13 is provided to enable the mobile station 15 to communicate with a counter station. The base station 13 forms and sets a cell 16 and is communicable with the mobile station 15 which is in the cell 16. For example, an interface between the base station 13 and the mobile station 15 is a radio line which is called Uu. A range of the cell 16 is determined based on the transmission power of the base station 13 and the ability of the base station 13 for search of the uplink signal from the mobile station 15.

The base station control unit 12 is a unit which controls the base station 13. The base station control unit 12 is connected with the base station 13 by an interface of a wiring line which is called Iub. The base station control unit 12 communicates with the mobile station 15 through the base station 13. Also, the base station control unit 12 is connected with a mobile switching station 11 (CN: Core Network; referred to as the mobile switching station, including an upper layer network in the present DESCRIPTION). The mobile switching station 11 is connected with a mobile station (a counter side station) which is owned by another user. Thus, the base station control unit 12 relays communication between the mobile station 15 and the counter side station. Also, the base station control unit 12 transmits and receives control signals of the call processing to and from the mobile station 15 and performs call setting of a communication to the mobile station 15.

The mobile station 15 is possessed by a user and is exemplified by a mobile phone terminal and so on. When being in the cell 16, the mobile station 15 is possible to communicate with the counter side station through the base station 13, the base station control unit 12, and the mobile switching station 11. For example, as this communication, calling, data communication and electric mail and so on are exemplified. Also, the mobile station 15 transmits and receives the control signal of the call processing to and from the base station control units 12.

The mobile relay station 14 is provided to notify that the area in which the function of the mobile station 15 is limited is set, to the mobile station 15. The mobile relay station 14 forms and sets a limitation area 17. In FIG. 3, the mobile relay station 14 is arranged in the cell 16. The mobile relay station 14 transmits a signal showing the limitation area toward the limitation area 17. The mobile station 15 receives this signal and recognizes the presence of itself in the limitation area 17 and limits the function. For example, the mobile relay station 14 is installed in locations where the communication should be limited, such as a hospital, a train, and a concert hall. It should be noted that in the present exemplary embodiment, a case where the mobile relay station 14 is used as the relay station which sets the limitation area 17 will be described. However, it is not always necessary to use the mobile relay station 14 as the relay station. As the relay station, not the mobile relay station 14 but a fixedly installed unit may be used.

Figure 4:
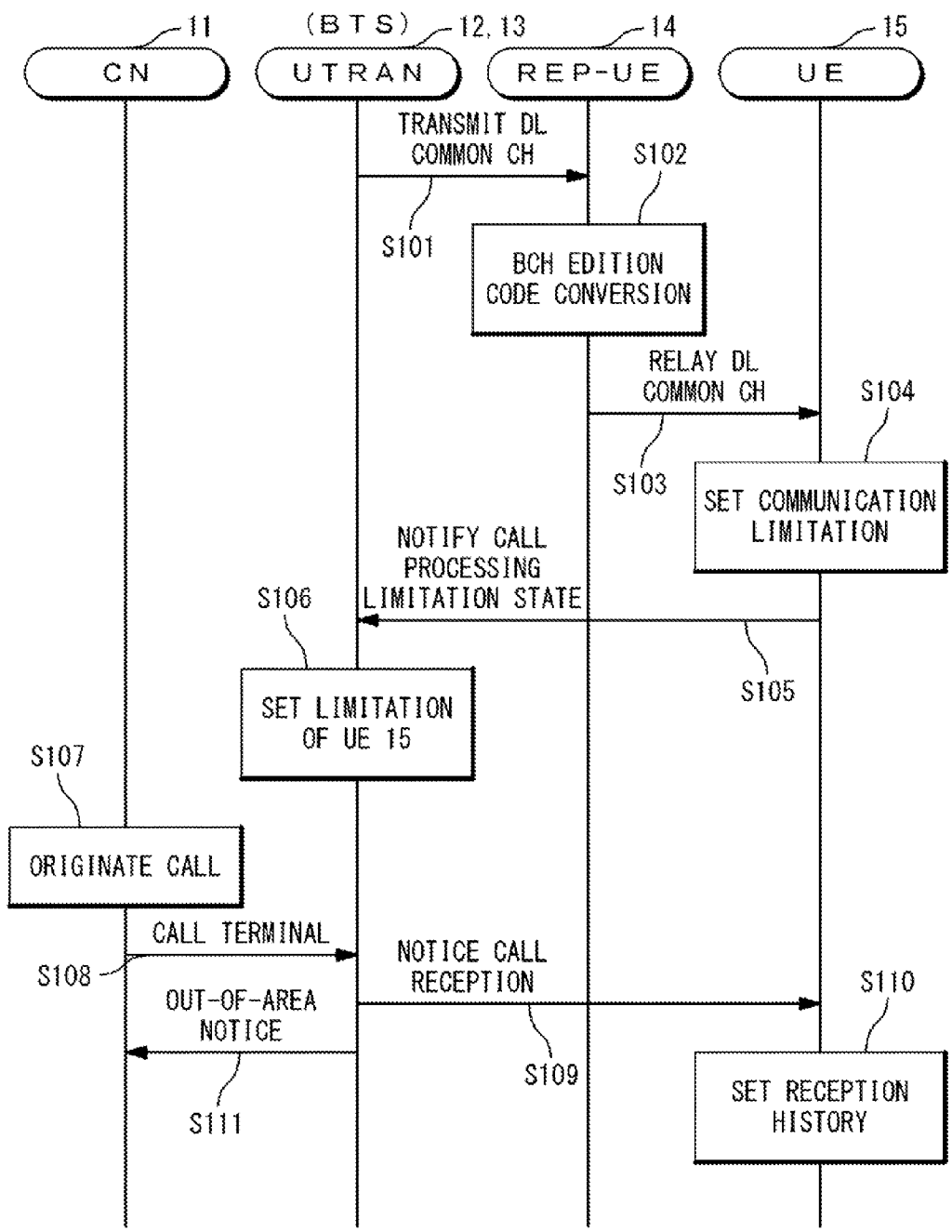
FIG. 4 is a sequence diagram showing the operation of the mobile communication system.

Referring to FIG. 4, the operation of the mobile communication system 1 according to the present exemplary embodiment will be described. The operation when the mobile station 15 is in the limitation area 17 where the call is limited is shown in FIG. 4.

Step S101: Transmission of DL Common CH

First, the base station 13 transmits a downlink signal to a plurality of mobile stations in the cell by a downlink common channel (DL common CH). The downlink signal transmitted on a downlink common channel is spread with a downlink scrambling code. In the mobile communication system 1, the base stations 13 neighbor to each other communicate with the mobile station 15 by using different scrambling codes in an identical frequency band. The downlink common channel is a channel for transmitting information which is necessary for the communication, to the mobile station 15. For example, by the downlink common channel, data showing the scrambling code used by the base station 13 and data to identify the base station 13 and so on are transmitted. The mobile station 15 receives (the downlink signal from) the downlink common channel, specifies the base station 13, and communicates with the base station 13 at appropriate timing.

Specifically, a primary synchronization channel (PSCH), a secondary synchronization channel (SSCH), a primary common pilot channel (P-CPICH), a primary common control physical channel (P-CCPCH) and so on are transmitted by use of the downlink common channel from the base station 13. The PSCH and the SSCH are channels to synchronize with the base station 13. The P-CPICH is a channel used for specifying a scrambling code, measuring a reception level and so on. The P-CCPCH contains a BCH (Broadcast Channel) which notice information is transmitted, and so on. This notice information contains data showing the downlink scrambling codes used in other base stations on the periphery of the base station 13 (the peripheral cell list of the base station).

Step S102: BCH Edition and Conversion of Scrambling Code

The mobile relay station 14 uses the downlink common channel from the base station 13 when notifying setting of the limitation area 17 toward the limitation area. That is, the mobile relay station 14 receives a downlink signal of the downlink common channel and specifies the downlink scrambling code. Then, the mobile relay station 14 edits the notice information which is contained in the BCH transmitted by use of the downlink common channel. Moreover, the mobile relay station 14 spreads the downlink signal after the edition, with a specific scrambling code different from the downlink scrambling code.

Step S103: Transmission of Relay Downlink Common Channel

The mobile relay station 14 relays the downlink signal spread with the specific downlink scrambling code toward the limitation area 17. That is, the mobile relay station 14 relays (the downlink signal on) the downlink common channel toward the mobile stations in the limitation area. The channel used in this case (channel on which the signal spread with the specific downlink scrambling code is transmitted) is hereinafter called a relay downlink common channel, which is distinguished from the downlink common channel.

Step S104: Call Limitation Setting

The mobile station 15 receives the relay downlink common channel, and recognizes that the mobile station 15 itself is in the limitation area 17. The mobile station 15 performs predetermined call limitation setting.

Step S105: Call Processing Limitation State Notice

The mobile station 15 generates an uplink signal indicating that it is in the call limitation area to notify to the base station 13 by using an uplink channel. The uplink signal is transmitted to the base station control unit 12 through the base station 13. At this time, the mobile station 15 transmits the uplink signal in synchronization with the direct reception of data from the base station 13 on the downlink common channel, not the relay downlink common channel from the mobile relay station 14.

Due to such an operation, it is not necessary to correctly synchronize the relay downlink common channel with the downlink common channel. Thus, it is not necessary to provide for the mobile relay station 14, a high function unit to synchronize the relay downlink common channel with the downlink common channel in a high accuracy. As a result, the mobile relay station can be cheaply configured and becomes possible to make size small.

Steps S106-S111: Limitation Setting

When receiving a notice of a call limitation setting state by the uplink signal, the base station control unit 12 sets call processing limitation to the mobile station 15 (Step S106). In this state, for example, when the mobile station 15 is called (Step S108) by a call originated from the mobile switching station 11 (step S107), the base station control unit 12 transmits a notice of a call reception to the mobile station 15 (Step S109), and issues a reception impossible notice to the mobile switching station 11 (Step S111). Also, the mobile station 15 receives the notice of call reception and performs update of history of a call reception such as a display of call reception on a display (Step S110).

Figure 5:
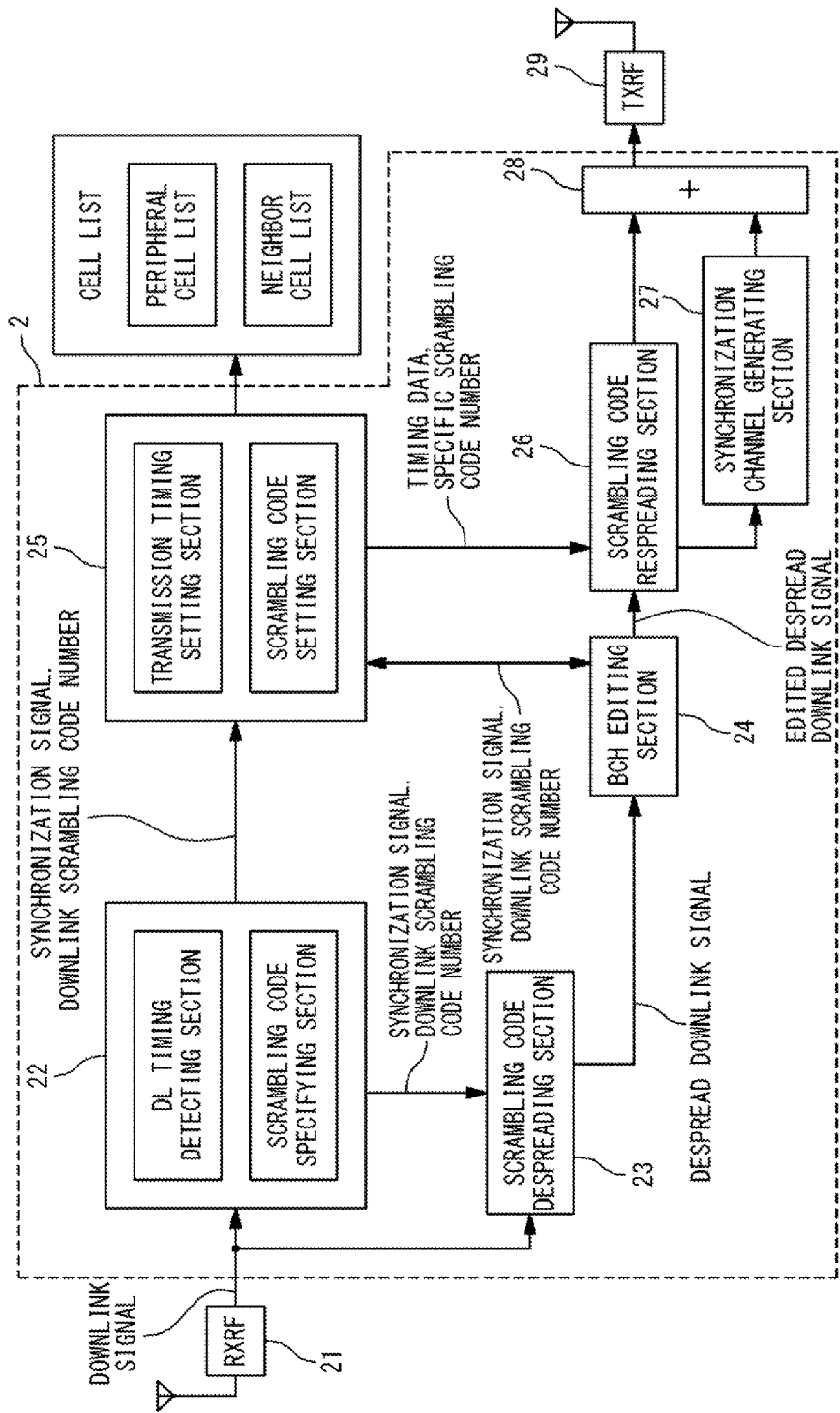
FIG. 5 is a block diagram showing a mobile relay station.

Referring to FIG. 5, the mobile relay station 14 will be described in detail. FIG. 5 is a block diagram showing the mobile relay station 14. The mobile relay station 14 has the receiving section (RXRF) 21, the transmission/reception control section 2 and the transmitting section (TXRF) 29. The transmission/reception control section 2 is provided with a downlink signal processing section 22, a scrambling code despreading section 23, a BCH editing section 24, a transmission condition setting section 25, a scrambling code re-spreading section 26, a synchronization channel generating section 27, and an adder 28. Also, the scrambling code number which is used in the cell formed in the neighborhood of the mobile relay station 14 is stored in the form of the cell list in the mobile relay station 14.

The receiving section 21 receives the downlink signal on the downlink common channel from the base station 13 and performs frequency conversion and analog-to-digital conversion on the downlink signal. The converted downlink signal is supplied to the downlink signal processing section 22 and the scrambling code despreading section 23.

The downlink signal processing section 22 has a downlink timing detecting section and a scrambling code specifying section. When acquiring the downlink signal from the radio receiving section 21, the downlink timing detecting section detects slot synchronization and frame synchronization by using PSCH, the SSCH and the P-CPICH and generates a synchronization signal. The scrambling code specifying section specifies a downlink scrambling code number by using these channels. The downlink signal processing section 22 notifies the generated synchronization signal and the specified downlink scrambling code number to the scrambling code despreading section 23 and the transmission condition setting section 25.

The functions of the above-mentioned radio receiving section 21 and the downlink signal processing section 22 may be the same as a part of the functions of a mobile station of the existing W-CDMA system. As mentioned previously, because it is not necessary to correctly synchronize the relay downlink common channel with the downlink common channel, it is not necessary to provide a high function unit as the timing detecting section. That is, it is not necessary to add new configuration as the radio receiving section 21 and the downlink signal processing section 22.

The scrambling code despreading section 23 performs the despreading on the downlink signal acquired from the radio receiving section 21 by using the synchronization signal and the downlink scrambling code. Then, the scrambling code despreading section 23 transmits the despread downlink signal to the BCH editing section 24.

The BCH editing section 24 acquires the notice information which is contained in the BCH of the P-CCPCH from the despread downlink signal. As mentioned previously, a base station peripheral cell list is contained in this notice information. Therefore, the BCH editing section 24 acquires and transmits this base station peripheral cell list to transmission condition setting section 25.

The transmission condition setting section 25 has a transmission timing setting section and a scrambling code setting section. The scrambling code setting section adds a downlink scrambling code number to the cell list. Also, the scrambling code setting section adds the base station peripheral cell list acquired from the BCH editing section 24 to the cell list. Then, the scrambling code setting section determines a specific scrambling code used for the relay downlink common channel so as not to overlap scrambling codes in the cell list stored in the relay mobile section. The transmission condition setting section 25 notifies the determined specific scrambling code to the BCH editing section 24 and the scrambling code re-spreading section 26. Also, the transmission timing setting section determines the transmission timing of the relay downlink signal based on the synchronization signal acquired from the downlink signal processing section 22. The transmission timing setting section transmits data of the determined transmission timing to the scrambling code re-spreading section 26.

The BCH editing section 24 adds data showing the limitation area and data showing the specific scrambling code number to the notice information of the despreading downlink signal. Thus, the despreading downlink signal after the edition is generated. The despreading downlink signal after the edition is transmitted from the BCH editing section 24 to the scrambling code re-spreading section 26.

The scrambling code re-spreading section 26 respreads the despread downlink signal after the edition, with the specific downlink scrambling code. Thus, the respread downlink signal is generated. The respread downlink signal contains patterns of the P-CPICH and the P-CCPCH for the relay. The scrambling code respreading section 26 transmits a respread downlink signal to the adder 28.

Also, the scrambling code respreading section 26 transmits the specific scrambling code number and data showing transmission timing to the synchronization channel generating section 27.

The synchronization channel generating section 27 generates a transmission pattern of SSCH and a fixed pattern of PSCH based on the specific scrambling code and the data showing the transmission timing, and transmits them to the adder 28.

The adder 28 adds the patterns acquired from synchronization channel generating section 27 to the respread downlink signal acquired from the scrambling code respreading section 26 and generates a relay downlink signal. The relay downlink signal is sent to a radio transmitting section 29.

The radio transmitting section 29 performs D/A conversion and frequency conversion on the relay downlink signal. Then, the radio transmitting section 29 transmits the relay downlink signal toward the limitation area 17 by using the relay downlink common channel.

By the above configuration, the mobile relay station 14 edits the notice information of the downlink signal received from the base station 13, converts the scrambling code into a specific scrambling code and relays a signal after the conversion toward the limitation area 17 as the relay downlink signal.

Figure 6:
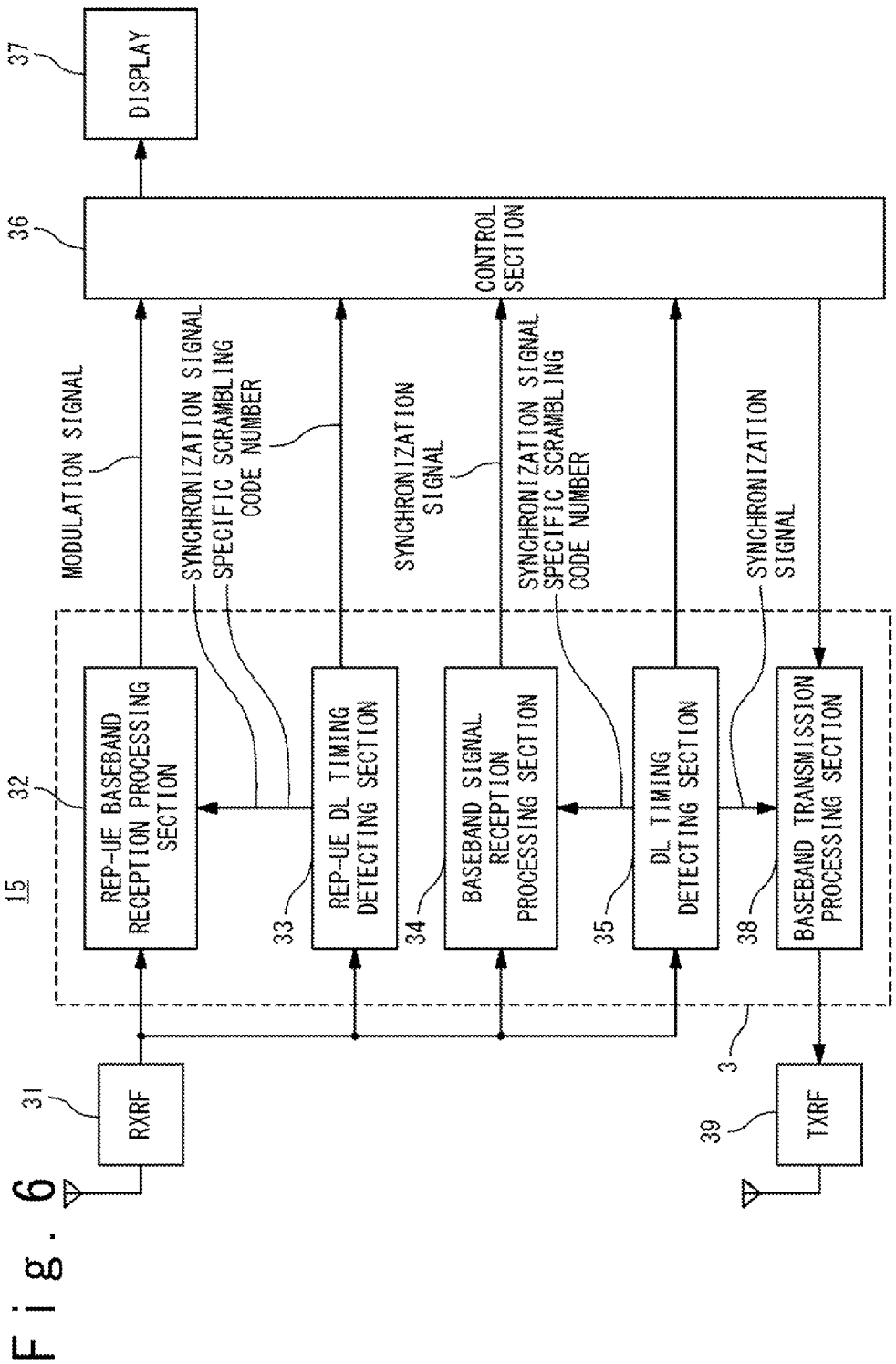
FIG. 6 is a block diagram showing the configuration of a mobile station.

Next, the configuration of the mobile station 15 will be described in detail. FIG. 6 is a block diagram showing the configuration of the mobile station 15. Here, only the necessary parts of the configuration of the mobile station 15 will be described. The mobile station 15 of the present exemplary embodiment is added with a function to limit its own function when the relay downlink signal is received, in addition to the function of the existing mobile station.

As shown in FIG. 6, the mobile station 15 is provided with the radio receiving section 31 (RXRF), the transmission/reception control section 3, the radio transmitting section 39, a control section 36 and a display 37. The transmission/reception control section 3 has a mobile relay station baseband reception processing section 32, a mobile relay station downlink timing detecting section 33, a baseband reception processing section 34, a downlink timing detecting section 35, and a baseband transmission processing section 38.

Figure 7:
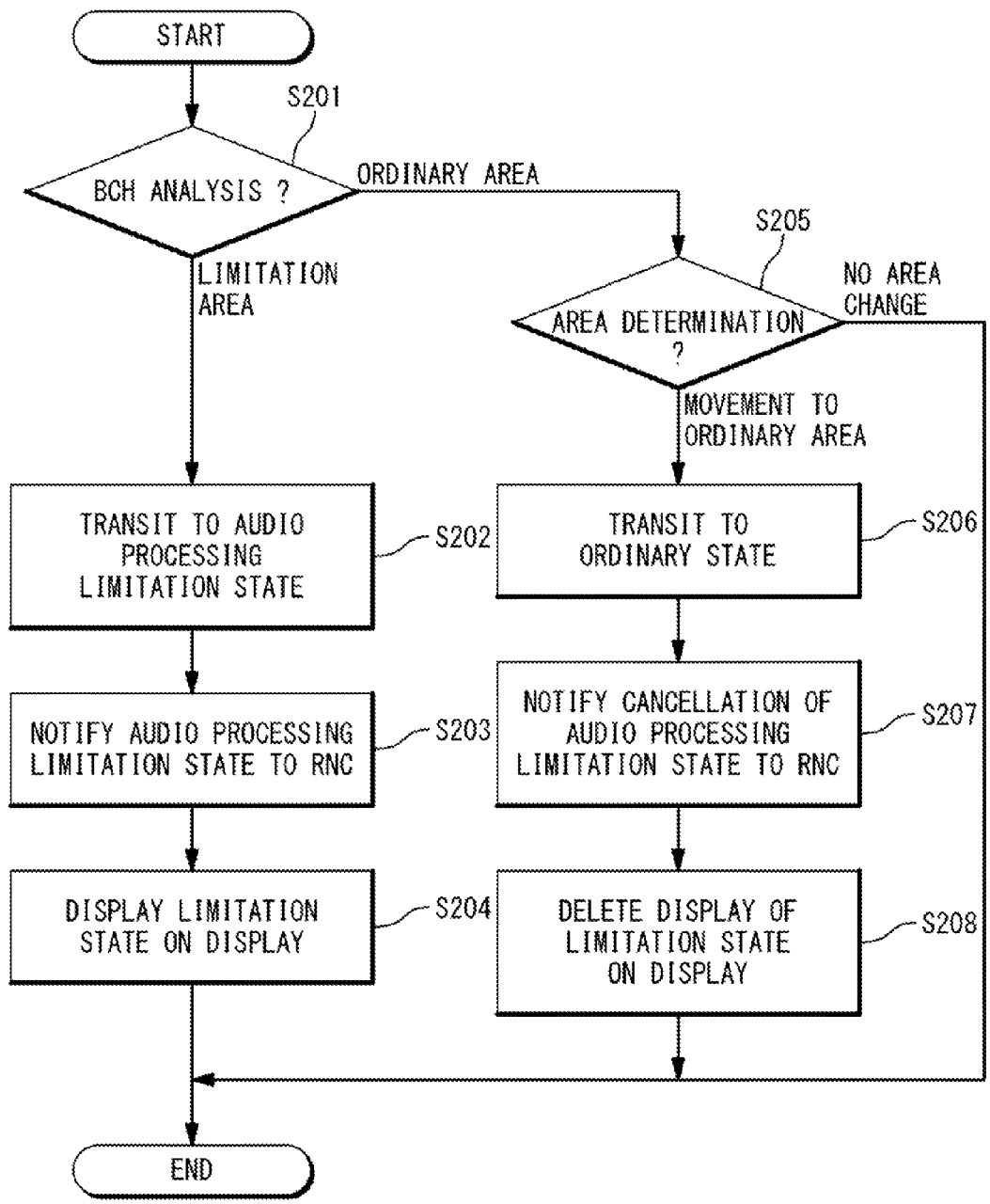
FIG. 7 is a flow chart showing the operation of the mobile station.

Referring to FIG. 7, an operation of the mobile station 15 will be described. FIG. 7 is a flow chart showing the operation of the mobile station 15 when call limitation processing is carried out.

Step S201: Analysis of Notice Information (BCH)

The mobile station 15 always analyzes the notice information of the received signal. That is, the radio receiving section 31 receives the downlink common channel from the base station 13 and the relay downlink common channel from the mobile relay station 14. Then, the radio receiving section 31 performs a frequency conversion on the signals received through these channels, and moreover performs an A/D conversion to digitize. The radio receiving section 31 transmits these digitized signals to the mobile relay station baseband reception processing section 32, the mobile relay station downlink timing detecting section 33, the baseband reception processing section 34 and the downlink timing detecting section 35.

The mobile relay station downlink timing detecting section 33 detects slot synchronization and frame synchronization from the relay downlink signal which is contained in the relay downlink common channel, of the signal which is received from the radio receiving section 31, and generates a synchronization signal. The synchronization signal is sent to the mobile relay station baseband reception processing section 32. Also, the mobile relay station downlink timing detecting section 33 specifies a scrambling code group from the relay downlink signal, and moreover, specifies the specific scrambling code number. The specific scrambling code number is sent from the mobile relay station downlink timing detecting section 33 to the mobile relay station baseband reception processing section 32 and the control section 36.

The mobile relay station baseband reception processing section 32 performs the despreading on the relay downlink signal based on the acquired synchronization signal and the specific scrambling code number, and performs synchronization detection. Moreover, the mobile relay station baseband reception processing section 32 performs decoding to generate a demodulation signal and notifies the demodulation signal to the control section 36.

The downlink timing detecting section 35 detects the slot synchronization and the frame synchronization from the downlink signal on the downlink common channel, of the signals received from the radio receiving section 31, and generates the synchronization signal. The synchronization signal is sent to the baseband reception processing section 34 and the baseband transmission processing section 38. Moreover, the downlink timing detecting section 35 specifies the scrambling code group from the downlink signal, and moreover specifies the downlink scrambling code number. The downlink scrambling code number is sent from the downlink timing detecting section 35 to the baseband reception processing section 34 and the control section 36.

The baseband reception processing section 32 performs the despreading on the downlink signal based on the acquired synchronization signal and the downlink scrambling code number, and performs synchronization detection. Moreover, the baseband reception processing section 32 performs decoding to generate the demodulation signal and notifies the demodulation signal to the control section 36.

The control section 36 is a section which carries out call processing with the base station control unit 12 and the processing of application and so on. The control section 36 decodes the notice information of the relay downlink signal based on the specific downlink scrambling code number acquired from the mobile relay station downlink timing detecting section 33 and the demodulation signal acquired from the mobile relay station baseband reception processing section 32. In the same way, the control section 36 performs the demodulating or decoding on the notice information of the downlink signal. Then, the control section 36 determines whether the mobile station 15 is in the limitation area 17 or in the ordinary area, based on the notice information.

Step S202: Transition to Speech Processing Limitation State

When recognizing from the decoded notice information that the mobile station is in the limitation area 17, the control section 36 limits its own function.

Step S203: Notice of Speech Processing Limitation State

After that, the control unit 36 generates uplink data for notifying to the base station control unit 12 (RNC) that the mobile station is in a function limitation state, and transmits to the baseband transmission processing section 38.

The baseband transmission processing section 38 sets the transmission timing of the uplink data based on the synchronization signal from the downlink timing detecting section 35. The baseband transmission processing section 38 performs modulation processing through the encoding and the spreading on the uplink data acquired from the control section 36 at the set transmission timing, and transmits the processing result to the radio transmitting section 39 as the uplink signal. That is, the uplink signal is transmitted in synchronization with the downlink signal (on the downlink common channel) from the base station 13.

The radio transmitting section 39 performs the D/A conversion and the frequency conversion on the uplink signal acquired from baseband transmission processing section 38 and transmits it to the base station 13.

Generally, the mobile station 15 has a plurality of sets of the baseband reception processing section and the downlink timing detecting section for the softer handover and diversity handover functions. Therefore, one of the plurality of sets can be allocated to the mobile relay station baseband reception processing section 32 and the mobile relay station downlink timing detecting section 33. That is, to provide the mobile relay station baseband reception processing section 32 and the mobile relay station downlink timing detecting section 33, it is not necessary to add a new configuration to the mobile station 15.

Step S204: Display Limitation State

After that, the control section 36 displays that the base station 15 is in a call processing limitation state on a display 37.

Step S205: Area Determination

On the other hand, at step S201, when it is confirmed that the mobile station 15 is in the ordinary area, the control section 36 determines whether the mobile station 15 moved from the limitation area 17 to the ordinary area in the cell 16 or the mobile station is originally in the ordinary area. When the presence area is not changed, the control flow ends just as it is.

Step S206: Transition to Ordinary State

The mobile station 15 is changed from the call limitation state to the ordinary state when it is determined that the mobile station 15 moved from the limitation area 17 to the ordinary area 16.

Step S207: Notify Limitation State Cancellation

Moreover, the control section 36 generates an uplink signal showing cancellation of the call limitation state and notifies to the base station 13 through the baseband transmission processing section 38 and the radio transmitting section 39.

Step S208: Limitation State Cancellation

After that, the control section 36 cancels (extinguishes) a display showing the call limitation state on the display 37.

AS described above, according to the present exemplary embodiment, the mobile station 15 transmits the uplink signal showing the function limitation state, based on not the relay downlink signal (relay downlink common channel) from the mobile relay station 14 but the synchronization timing of the downlink signal (the downlink common channel) from the base station 13. Therefore, the mobile relay station 14 does not need a high performance function to correctly synchronize the relay downlink common channel with the downlink common channel. With this, the configuration of the mobile relay station 14 can be simplified.

Figure 8:
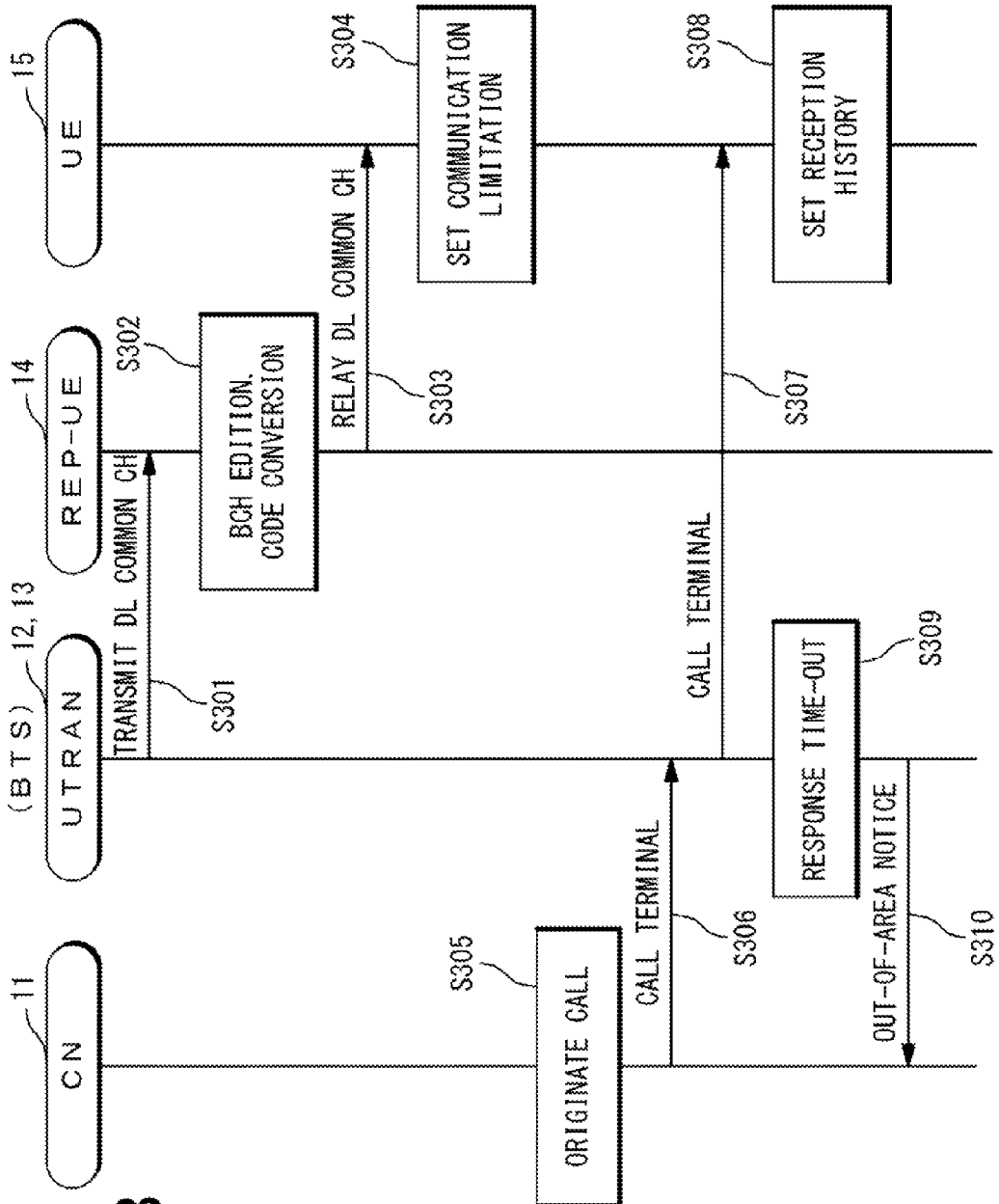
FIG. 8 is a time chart showing the operation of the mobile communication system.

It should be noted that in the above-mentioned description, a case that the limitation area 17 is the call limitation area has been described. In the following description, a case that the limitation area 17 is not the call limitation area but a communication limitation area will be described. In case of the communication limitation area, the mobile station 15 does not transmit any uplink signal. FIG. 8 shows a sequence diagram in the operation of the whole mobile communication system 1 in this case.

The base station 13 transmits a signal of the downlink common channel (PSCH, SSCH, P-CPICH, P-CCPCH, and so on) toward the cell 16 with radio (Step S301). The mobile relay station 14 specifies the downlink scrambling code of the cell 16 and edits the notice information of the BCH. Then, the mobile relay station 14 converts the downlink scrambling code on the downlink common channel into the specific scrambling code (Step S302). The mobile relay station 14 relays the downlink common channel toward the limitation area 17 by the relay downlink common channel for a signal spread with the specific scrambling code (Step S303).

The mobile station 15 receives a signal on the relay downlink common channel from the mobile relay station 14 and recognizes from the notice information of the BCH that the mobile station 15 is in the limitation area 17 to which the communication limitation (the uplink output prohibition) is applied. The mobile station 15 performs a previous communication limitation setting (Step S304). At this time, unlike the previously mentioned communication limitation area, the uplink signal showing that the mobile station 15 is in the call processing limitation state is not transmitted to the base station 13.

For example, when the mobile station 15 is in the communication limitation state, it is supposed that the mobile station 15 receives a call signal (step S305) from another mobile station through the mobile switching station 11 (Step S306). At this time, if the position registration by the mobile station 15 is effective, the base station control unit 12 performs a terminal call to the mobile station 15 (Step S307). The mobile station 15 receives the call signal from the base station control unit 12 and performs the reception history setting such as a display of a call reception on the display 17 (Step S308). The base station control unit 12 issues an out-of-area notice to the mobile switching station 11 (Step S310) when elapse time of the response from the mobile station 15 exceeds a preset time (step S309).

Figure 9:
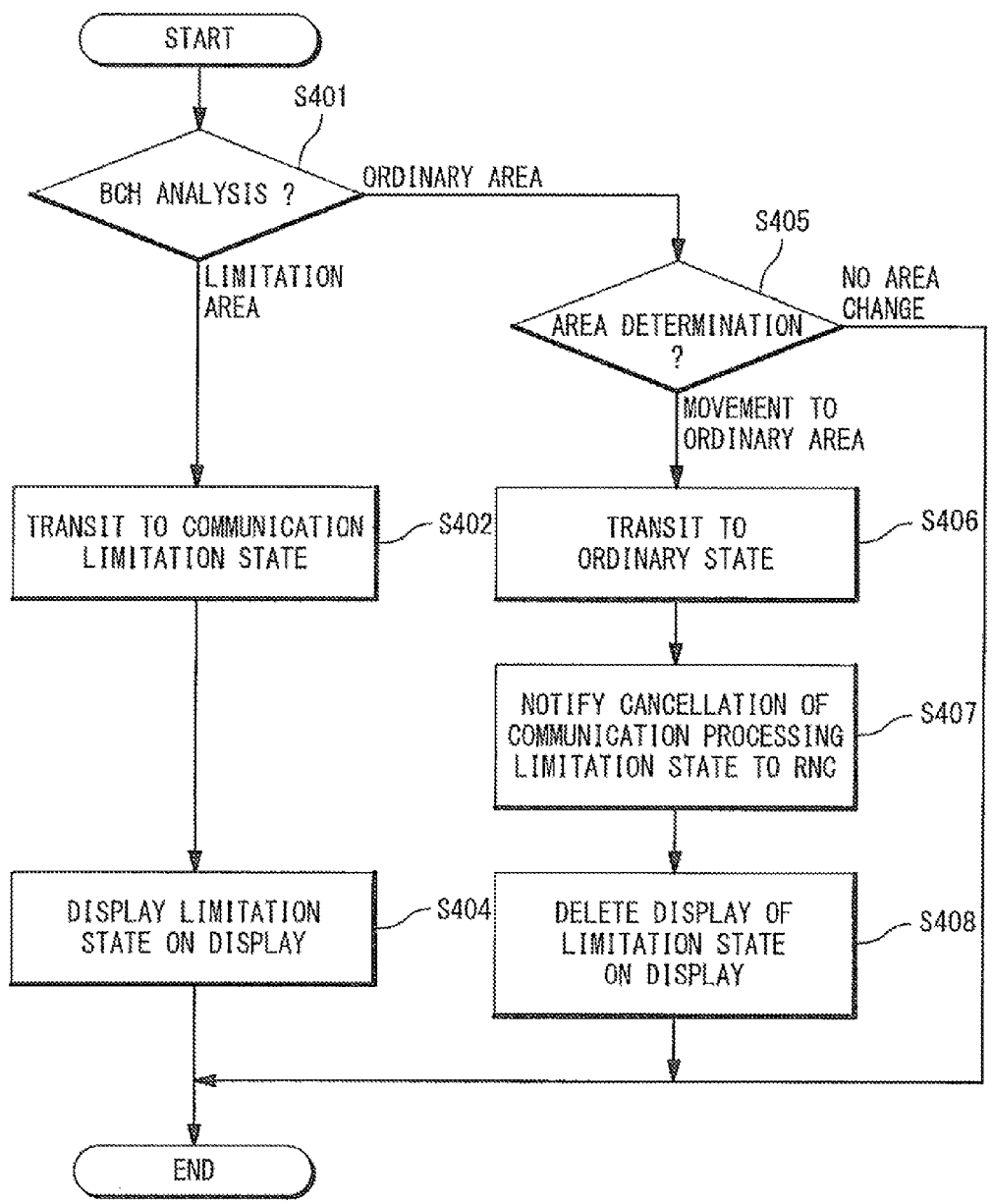
FIG. 9 is a flow chart showing the operation of the mobile station.

Next, the operation when the mobile station 15 is in the communication limitation area will be described in detail. FIG. 9 is a flow chart showing the operation of the mobile station 15.

The mobile station 15 always analyzes the BCH of the downlink signal (Step S401). When recognizing that the mobile station 15 is in the communication limitation area based on the notice information of the BCH, the control section 36 of the mobile station 15 transits to the communication limitation state (Step S402). Next, the mobile station 15 displays that the mobile station is in the communication limitation state, on the display 37 (Step S404). With this, the mobile station 15 in the limitation area 17 is set to the state that communication is limited. On the other hand, at step S401, when it is confirmed that the mobile station 15 is in the ordinary area, the area determination is performed of whether the mobile station moved from the limitation area 17 into the ordinary area in the cell 16 or the mobile station 15 is originally in the ordinary area (Step S405). When it is determined that the mobile station 15 moved from the limitation area 17 to the ordinary area, the mobile station 15 transits from the communication limitation state to the normal state (Step S406). After that, the mobile station 15 notifies the communication processing limitation state cancellation to the base station control unit 12 (step S407). Moreover, the mobile station 15 deletes the display of the limitation condition on the display 37 (Step S408).

By the way, in the present exemplary embodiment, a technique for maintenance free of the mobile communication system is adopted.

The scrambling code is a code used to identify the cells. The number of scrambling codes is not infinite and 512 kinds of codes are prescribed in the W-CDMA cellular system. In order to prevent interference, the scrambling code of a same kind is not used in a short distance. In the conventional technique, the computer simulation was performed based on the position and antenna configuration of the base station, an radio wave reaching area was estimated every base station. Then, the scrambling code of each cell was adjusted so as for the same scrambling code not to be set to the base stations that the radio wave reaching areas overlap. Therefore, a designer must perform the setting again when the mobile relay station is installed or a base station is newly installed. Also, because the scrambling code was set by using the computer simulation, an error sometimes occurred between the radio wave reaching area of the simulation result and the actual reaching area of the radio wave. In such a case, the interference had occurred and the design must be performed again. Therefore, the load of the designer was large. Also, when using the mobile relay station 14 as in the present exemplary embodiment, the mobile relay station 14 has a possibility to be installed in an unspecified location. Therefore, it is difficult for a communication carrier to grasp the installation position of the mobile relay station 14 and a specific scrambling code.

In JP 2006-140829A, the base station transmits a provisional downlink scrambling code before the determination of the downlink scrambling code. Then, a final downlink scrambling code is determined based on the reception report from a mobile station in the area and a peripheral cell list from the base station control unit.

However, when the limitation area 17 is formed by the mobile relay station 14, it is difficult to use the provisional downlink scrambling code. That is, the mobile relay station 14 is installed in an unspecified location and the mobile relay station 14 cannot be connected with the base station control unit 12 by a wiring line. Therefore, it is difficult to automatically set the specific scrambling code of the mobile relay station 14 by using the data from the base station control unit 12. Also, when using the provisional scrambling code, if there is not the mobile station 15 in the limitation area 17, the specific scrambling code cannot be determined.

On the other hand, in the mobile communication system 1 of the present exemplary embodiment, the mobile relay station 14 receives the downlink common channel and acquires the downlink scrambling code used by the base station 13. Also, when another mobile relay station exists on the periphery, the mobile relay station 14 receives (a signal on) the relay downlink common channel from the other mobile relay station. Thus, the mobile relay station 14 acquires the scrambling code used by the other mobile relay station and the scrambling codes used in the cells on the periphery of the other mobile relay station. Then, the mobile relay station 14 determines the specific scrambling code to be used for the relay downlink common channel based on these acquired scrambling codes. With this, the mobile communication system can operate in maintenance free. Below, this point will be described in detail.

First, a peripheral cell list and a neighbor cell list are contained in the cell list which is stored in the mobile relay station 14. The peripheral cell list shows a list of the scrambling code numbers which are used in the cells formed on the periphery of the mobile relay station 14. On the other hand, a list of the scrambling code numbers used in the downlink common channel which the mobile relay station 14 receives is shown as the neighbor cell list. That is, the list of the scrambling code numbers used in the cells in the neighborhood of the mobile relay station 14 is shown.

Thus, the mobile relay station 14 generates a relay cell list based on the cell list stored therein when transmitting (a signal on) the relay downlink common channel. Then, the mobile relay station 14 transmits the relay cell list on the relay downlink common channel. Here, a relay peripheral cell list and a relay neighbor cell list are contained in the relay cell list. How the relay peripheral cell list and the relay neighbor cell list are determined will be described later.

Next, the operation when the mobile relay station 14 determines the specific scrambling code will be described. FIG. 10 is a flow chart showing an operation method of the mobile relay station 14.

The mobile relay station 14 first performs cell search as in the conventional mobile station, and receives the downlink common channel from the base station 13 or the relay downlink common channel from another mobile relay station. Then, the mobile relay station 14 receives a synchronization channel and a first common pilot channel which are contained in these channels (Step S501). Next, the mobile relay station 14 specifies the scrambling code to be used based on the synchronization channel and the first common pilot channel (Step S502). Next, the mobile relay station 14 adds the specified scrambling code number to the cell list stored therein as the neighbor cell list (Step S503). Moreover, the mobile relay station 14 performs reception processing of a BCH (Step S504). Then, the mobile relay station 14 acquires the cell list which is contained in the notice information of the BCH. When the BCH is from the base station 13, the scrambling code used in another base station in the neighborhood of the base station 13 is contained in the BCH as the base station peripheral cell list. On the other hand, when the BCH is from the other mobile relay station, the scrambling code which is used in the cell around the other mobile relay station is contained in the BCH as the relay cell list. Therefore, the mobile relay station 14 acquires the base station peripheral cell list or the relay cell list. The mobile relay station 14 adds the scrambling code number which is contained in the acquired cell list to the cell list in the mobile relay station 14 as a peripheral cell list. In this case, the mobile relay station 14 distinguishes whether the added scrambling code number was acquired from the base station 13 or from the other mobile relay station. Also, the mobile relay station 14 distinguishes whether the scrambling code number which is contained in the relay cell list is for a peripheral relay cell list or for a neighbor relay cell list (Step S505). Here, when the downlink common channel is received from another base station and another mobile relay station, the processing of steps S501 to S505 is repeated (Step S506).

FIG. 11A is a conceptual diagram showing an example of the cell list stored in the mobile relay station 14 through the processing to step S506. In an example shown in FIG. 11A, as the cell list, 1 to 6 scrambling codes are stored. Among these, the first to fourth scrambling codes are stored as the peripheral cell list. On the other hand, fifth and sixth scrambling codes are stored as the neighbor cell list. Also, it is shown that the first and fourth scrambling codes are the scrambling codes written in the neighbor cell list of the base station control unit 12 (RNC). The second scrambling code is the scrambling code registered in the peripheral relay cell list of another neighbor mobile relay station neighbor to the mobile relay station 14. The third scrambling code is the scrambling code registered in the neighbor relay cell list of the other neighbor mobile relay station neighbor to the mobile relay station 14.

Next, the mobile relay station 14 determines a specific scrambling code (scrambling code for REP-UE) (Step S507). In this case, the mobile relay station 14 determines the specific scrambling code such that the scrambling codes contained in the cell list stored therein are not used. In the example of FIG. 11A, the first to sixth scrambling codes are never selected as the specific scrambling code. That is, the specific scrambling code is selected based on the following conditions (1) to (3).

(1) The scrambling codes written in the neighbor cell list of the mobile relay station are not used. That is, the scrambling codes used in the base station neighbor to the mobile relay station 14 and another neighbor mobile relay station are not used. In the example shown in FIG. 11A, the fifth and sixth scrambling codes are not used.

(2) The scrambling codes which are contained in the cell list (the base station peripheral cell list and the relay cell list) received from the base station and the other mobile relay station are not used. In other words, the scrambling codes which exist in the cell lists collected at step 504 are not used. In case of the example shown in FIG. 11A, the first to fourth scrambling codes are not used.

(3) The specific scrambling code is randomly selected from a group of the unused scrambling codes under the conditions (1) and (2).

Figure 11B:
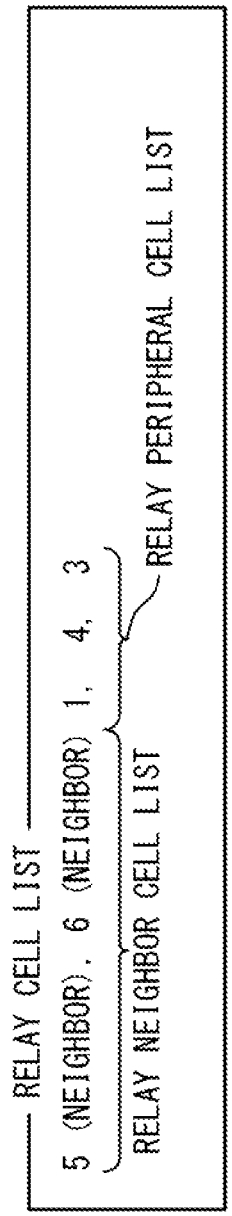
FIG. 11B is a conceptual diagram showing a cell list.

After determining the specific scrambling code, the mobile relay station 14 generates the relay cell list to be incorporated in the notice information of the BCH so as to meet the following conditions (4)-(6) (Step S508). It should be noted that an example of the relay cell list is shown in FIG. 11B.

(4) The mobile relay station 14 adds the scrambling codes received by itself to the relay cell list. In other words, the mobile relay station 14 adds the scrambling codes written in the neighbor cell list. In this case, the mobile relay station 14 adds a fact that the codes are contained in the neighbor cell list, to the scrambling codes as the neighbor relay cell list. That is, as shown in FIG. 11B, the fifth and sixth scrambling codes are added as the neighbor relay cell list.

(5) The mobile relay station 14 adds the scrambling codes contained in the base station peripheral cell list from the base station control unit 12, of the peripheral cell lists as the relay peripheral cell list. That is, as shown in FIG. 11B, the first and fourth scrambling codes are added as the relay peripheral cell list.

(6) Of the scrambling codes contained in the peripheral cell list of the notice information received from another neighbor mobile relay station, the mobile relay station 14 adds the scrambling codes written in the neighbor cell list of the other mobile relay station as the relay peripheral cell list. That is, as shown in FIG. 11B, the third scrambling code is added as the relay peripheral cell list. Here, because the second scrambling code is a code which is contained in the peripheral cell list of the other neighbor mobile relay station, it is not selected.

After that, the mobile relay station 14 edits a BCH such that the relay cell list and the data indicating presence in the limitation area are contained in the notice information (Step S509). After that, the mobile relay station 14 starts the relay processing of SCH, P-CPICH and P-CCPCH (Steps S510 and S511).

Through the above-mentioned processing, when determining the specific scrambling code, the mobile relay station 14 is sufficient to receive the downlink common channel from the base station and the relay downlink common channel from the mobile relay station. The special operation to determine the specific scrambling code is not required to the mobile station 15 and the base station control unit 12. That is, the mobile relay station 14 can determine the specific scrambling code automatically without the cooperation of the mobile station 15 and the base station control unit 12. Therefore, the mobile communication system can be set maintenance free.

In the above, referring to the exemplary embodiments, the present invention has been described. However, the present invention is not limited to the exemplary embodiments. A person in the art could make various modifications to the configuration and the operation of the present invention appropriately without departing away from the technical scope of the present invention.

It should be noted that the present application claims a priority based on Japanese Patent Application No. 2009-063269 filed on Mar. 16, 2009, and the disclosure thereof is incorporated herein by reference.

(Item 1)

A mobile communication system including:

a mobile station connected with a base station with radio when being in a cell formed by the base station, and configured to communicate with a counter side unit through the base station; and a relay station configured to form a limitation area, wherein the relay station receives a downlink signal from the base station and transmits a limitation downlink signal obtained by adding information showing that it is in the limitation area to the downlink signal to the limitation area, and wherein when receiving the limitation downlink signal, the mobile station transmits an uplink signal showing a function limited state to the base station in synchronization with a downlink channel received from the base station.

(Item 2)

The mobile communication system according to Item 1, wherein the mobile station limits its own function when receiving the limitation downlink signal.

(Item 3)

The mobile communication system according to Item 1 or 2, wherein the function limited state is a call limited state.

(Item 4)

The mobile communication system according to any of Items 1 to 3, wherein the relay station detects synchronization timing of the downlink signal based on a reception result of the downlink signal, and determines a transmission timing of the limitation downlink signal based on the detection result of the synchronization timing.

(Item 5)

The mobile communication system according to any of Items 1 to 4, wherein the downlink signal is spread with a downlink scrambling code and transmitted into the cell, and wherein the relay station spreads the downlink signal with a specific scrambling code different from the downlink scrambling code, and transmits the spread signal as the limitation downlink signal.

(Item 6)

The mobile communication system according to Item 5, wherein the notice information which contains information showing the downlink scrambling code used by the base station and information showing the scrambling code used by a peripheral base station provided around the base station in the downlink signal, and wherein the relay station determines the scrambling code used as the specific scrambling code based on the notice information.

(Item 7)

The mobile communication system according to Item 6, wherein the relay station further determines the scrambling code used as the specific scrambling code based on the notice information which is contained in the received limitation downlink signal when receiving the limitation downlink signal from another relay station.

(Item 8)

The mobile communication system according to Item 7, wherein the limitation downlink signal contains information which specifies the downlink scrambling code used in the base station, the specific scrambling code used in the other relay station, and the scrambling code used in a cell neighbor to the other relay station.

(Item 9)

The relay station used in the mobile communication system according to any of Items 1 to 8.

(Item 10)

The mobile station used in the mobile communication system according to any of Items 1 to 8.

(Item 11)

A mobile communication method including:

a mobile station communicating with a counter side through the base station connected in a radio, when the mobile station is in a cell formed by the base station;

a relay station forming a limitation area;

the relay station receiving a downlink signal from the base station and transmitting a limitation downlink signal obtained by adding information showing a limitation area to the downlink signal toward the limitation area; and the mobile station transmitting an uplink signal showing a function limited state to the base station in synchronization with reception of a downlink channel from the base station, when receiving the limitation downlink signal.

(Item 12)

The mobile communication method according to Item 11, further including:

the mobile station limiting its own function when receiving the limitation downlink signal.

(Item 13)

The mobile communication method according to Item 11 or 12, wherein the function limited state is a call limited state.

(Item 14)

The mobile communication method according to any of Items 11 to 13, further including:

the base station spreading the downlink signal with a downlink scrambling code and transmitting the spread downlink signal toward the cell, wherein the transmitting a limitation downlink signal toward the limitation area includes:

spreading the limitation downlink signal with a specific scrambling code different from the downlink scrambling code and transmitting as the limitation downlink signal.

(Item 15)

The mobile communication method according to any of Items 11 to 14, wherein the notice information is contained in the downlink signal and contains data showing the downlink scrambling code used by the base station and data showing a peripheral downlink scrambling code used in a peripheral base station which is provided around the base station, wherein the transmitting the limitation downlink signal includes:
determining the scrambling code to be used as the specifying scrambling code based on the notice information.
(Item 16)
An operation method of a mobile station in a mobile communication method, including:
communicating with a counter side station through the base station connected by radio, when the mobile station is in a cell formed by a base station;
receiving a limitation downlink signal from a relay station which forms a limitation area;
transmitting an uplink signal showing limitation of its function to the base station in synchronization with a downlink channel received from the base station, when receiving the limitation downlink signal.
(Item 17)
An operation method of a relay station in a mobile communication method, including:
forming a limitation area;
receiving a downlink signal spread with a downlink scrambling code from a base station;
adding data showing the limitation area to the downlink signal and generating a limitation downlink signal;
spreading the limitation downlink signal with a specific scrambling code different from the downlink scrambling code to transmit toward the limitation area,
wherein notice information is contained in the downlink signal and contains data showing the downlink scrambling code used by the base station and data showing a peripheral downlink scrambling code used in a peripheral base station which is provided around the base station,
wherein the transmitting toward the limitation area includes:
determining the scrambling code to be used as the specifying scrambling code based on the notice information.

The invention claimed is:

1. A mobile communication system comprising:
a mobile station connected with a base station by radio when being in a cell formed by said base station, and configured to communicate with a counter side unit through said base station; and
a relay station configured to form a limitation area,
wherein said relay station receives a downlink signal from said base station and transmits a limitation downlink signal obtained by adding information showing that it is in the limitation area to said downlink signal to said limitation area,
wherein when receiving the limitation downlink signal, said mobile station transmits an uplink signal showing a function limited state to said base station in synchronization with a downlink channel received from said base station,
wherein said relay station detects synchronization timing of said downlink signal based on a reception result of said downlink signal, and determines a transmission timing of said limitation downlink signal based on the detection result of the synchronization timing,
wherein said relay station detects slot synchronization and frame synchronization by using a primary synchronization channel (PSCH), a secondary synchronization channel (SSCH), and a primary common pilot channel (P-CPICH) and generates a synchronization signal,
wherein said relay station specifies a downlink scrambling code number by using these channels,
wherein said downlink signal is spread with a downlink scrambling code and transmitted into the cell,
wherein said relay station spreads said downlink signal with a specific scrambling code different from said downlink scrambling code, and transmits the spread signal as said limitation downlink signal,
wherein notice information which contains information showing said downlink scrambling code used by said base station and information showing the scrambling code used by a peripheral base station provided around said base station is in said downlink signal, and
wherein said relay station determines the scrambling code used as said specific scrambling code based on said notice information.

2. The mobile communication system according to claim 1, wherein said mobile station limits its own function when receiving said limitation downlink signal.

3. The mobile communication system according to claim 1, wherein the function limited state is a call limited state.

4. The mobile communication system according to claim 1, wherein said relay station further determines the scrambling code used as said specific scrambling code based on said notice information which is contained in the received limitation downlink signal when receiving said limitation downlink signal from another relay station.

5. The mobile communication system according to claim 4, wherein said limitation downlink signal contains information which specifies the downlink scrambling code used in said base station, the specific scrambling code used in the other relay station, and the scrambling code used in a cell neighbor to the other relay station.

6. A mobile communication method including:
a mobile station communicating with a counter side station through said base station connected by radio, when said mobile station is in a cell formed by said base station;
a relay station forming a limitation area;
said relay station receiving a downlink signal from said base station and transmitting a limitation downlink signal obtained by adding information showing a limitation area to said downlink signal toward said limitation area;
said mobile station transmitting an uplink signal showing a function limited state to said base station in synchronization with reception of a downlink channel from said base station, when receiving said limitation downlink signal;
said relay station detecting synchronization timing of said downlink signal based on a reception result of said downlink signal, and determining a transmission timing of said limitation downlink signal based on the detection result of the synchronization timing;
said relay station detecting slot synchronization and frame synchronization by using a primary synchronization channel (PSCH), a secondary synchronization channel (SSCH), and a primary common pilot channel (P-CPICH) and generating a synchronization signal; and
said relay station specifying a downlink scrambling code number by using these channels,
wherein said downlink signal is spread with a downlink scrambling code and transmitted into the cell,
wherein the method further includes said relay station spreading said downlink signal with a specific scrambling code different from said downlink scrambling code, and transmitting the spread signal as said limitation downlink signal,
wherein notice information which contains information showing said downlink scrambling code used by said base station and information showing the scrambling code used by a peripheral base station provided around said base station is in said downlink signal, and wherein the method further includes said relay station determining the scrambling code used as said specific scrambling code based on said notice information.

* * * * *